Figure 2:
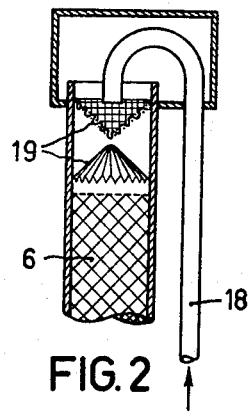
Figure 3:
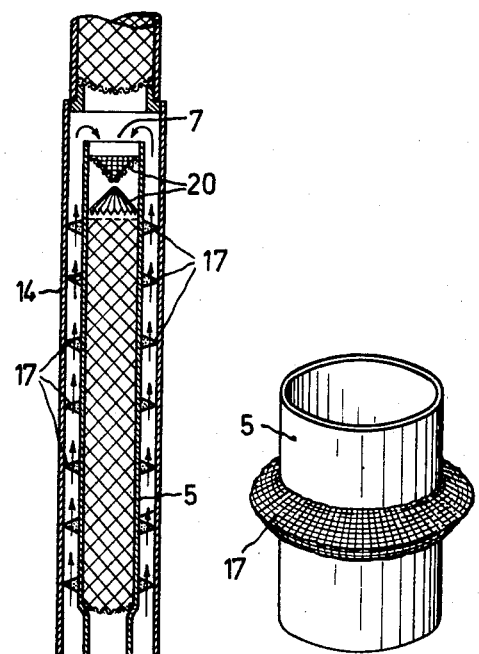
Figure 1:
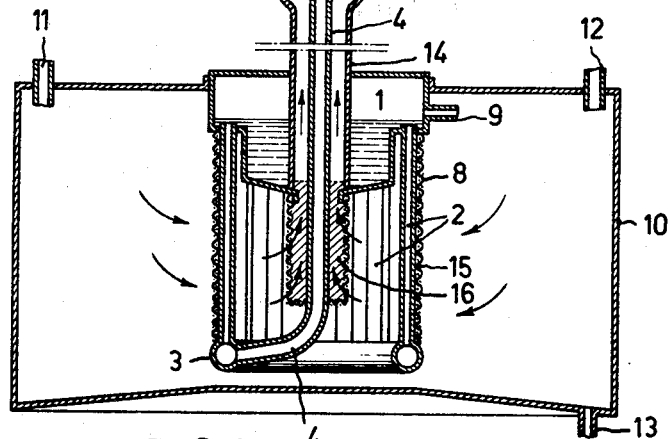

March 10, 1964     E. HELLINGMAN ETAL     3,124,443

GAS FRACTIONATING SYSTEM

Filed May 12, 1961

INVENTOR
EVERT HELLINGMAN.
KLAAS ROOZENDAAL.
BY
AGENT tionated is supplied through openings 11 and 12. The water separated out of this gas is collected on the bottom of the housing 10 and conducted away through a duct 13.

Around the tube 4 and the column part 5 is arranged a tube 14. The tube 14 traverses the boiling vessel 1 and is fastened at the bottom to a receptacle 15, provided with annular openings and containing filter material 16. On the outer surface of the tube 14 are provided rings 17, which are made of gauze and which are located in spaced relationship about the lower cylindrical part 5. The shape of the gauze ring may be irregular, which may be achieved by crumpling up a strip of gauze. Through the pipe 18 liquid gas is fed back as a reflux into the column. The liquid is distributed in the column by distributors 19 and 20.

The assembly shown is surrounded, in practice, by a heavy insulation from heat losses. The top part of the column may be connected with the head of a cold-gas refrigerator, which then serves as a source of cold for the gas fractionating column. In this case it is not necessary to supply the gas to be fractionated with a higher pressure than the atmospheric pressure.

The system operates as follows:

The gas to be fractionated is supplied through the openings 11 and 12 into the housing 10. Water is separated out partly by condensation and is collected on the bottom of the housing 10.

The gas encounters on its way to the column first the strongly cooled gauze 8. On this gauze is formed a cake of snow containing crystals of water and carbon dioxide. This cake remains surprisingly pervious to the gas for a long time. The gas is strongly cooled on the gauze 8 and the tubes 2 and flows through the filter 15, 16 upwards into the annular space between the tubes 4 and 14 and between the column parts 5 and 14.

On the wall of the column part 5 the gas is further cooled. In the annular space between the column part 5 and the tube 14 the gas encounters in its flow the gauze rings 17. These rings trap acetylene snow in the spaces of the gauze not yet collected on the cake of snow on the gauze 8 and thus keep the acetylene far remote from the contents of the boiling vessel 1.

Even with high initial concentrations of acetylene in the supplied gas it appears that the gauze 8 and the rings 17 are so highly effective that no dangerous acetylene concentrations occur in the boiling vessel.

The present system may be used for reducing the hazards of other hydrocarbons as well as acetylene.

What is claimed is:

1. A gas fractionating system having a feed gas containing acetylene and producing a product in a liquid state comprising a fractionating column provided at the bottom thereof with a boiling vessel for collecting liquid from said column, a housing having openings therein through which the feed gas to be fractionated is supplied, said boiling vessel being located in said housing, a cage in said housing having a gas permeable wall, said cage depending from and connected to said boiling vessel and being the first cooler for said gas, a second cooler arranged in the path of gas flow toward said fractionating column and cooling the gas further, said second cooler being a plurality of spaced gas-pervious members secured to and in heat exchange with the lower part of said column which collect acetylene and other substances separated out by the freezing of the feed gas flowing through said members, the path of said feed gas being through said openings in said housing, through the gas permeable walls on said cage, along the outer periphery of said column, and through said spaced gas-pervious members secured to said column and into the interior of the latter.

2. A gas fractionating system having a feed gas containing acetylene and producing a product in a liquid state comprising a fractionating column provided at the bottom thereof with a boiling vessel for collecting liquid from said column, a housing having openings therein through which the feed gas to be fractionated is supplied, said boiling vessel being located in said housing, a cage in said housing having a gas permeable wall, said cage depending from and connected to said boiling vessel and being the first cooler for said gas, a second cooler arranged in the path of gas flow toward said fractionating column and cooling the gas further, said second cooler being a cooled wall of the lower part of said column having a plurality of gauze rings secured to the outer wall of said column in spaced locations which collect acetylene separated out by the freezing of the feed gas flowing through said gauze rings, the path of said feed gas being through said openings in said housing, through the gas permeable wall on said cage, along the outer periphery of said column, and through said spaced gauze rings secured to said column and into the interior of the latter.

3. A gas fractionating system having a feed gas containing acetylene and producing a product in a liquid state comprising a fractionating column, a boiling vessel at the lower end of said column for collecting liquid gas, a housing surrounding said boiling vessel and having openings therein through which the feed gas to be fractionated is supplied, a cage in said housing having a gauze wall secured thereto which also substantially surrounds said boiling vessel, said cage and gauze wall being cooled by said boiling vessel thereby being the first cooler for the gas to be fractionated, a second cooler formed by a lower portion of the wall of said column and provided with a plurality of spaced gas-pervious members secured to outer portions of said wall and which collect acetylene from the gas traversing therethrough, the path of said feed gas being through said openings in the housing, through the gauze wall on said cage, along the outer periphery of said column and through said spaced, gas pervious members secured to the outer portions of the wall of said column and into the interior of the latter.

4. A gas fractionating system as claimed in claim 1 wherein said cage includes a plurality of tubes, and a ring duct for receiving the liquid product from said fractionating column, each of said tubes being connected at one end to said boiling vessel and in heat exchanging relationship thereof and connected at the other end to said ring duct, a filter surrounding and connected to at least some of said tubes whereby the gas passes therethrough before entering said column.

References Cited in the file of this patent

UNITED STATES PATENTS

| | | |
|---|---|---|
| 1,535,819 | Emmet | Apr. 28, 1925 |
| 1,717,540 | Aubert | June 18, 1929 |
| 2,783,623 | Dodge | Mar. 5, 1957 |
| 2,825,680 | Stutz | Mar. 4, 1958 |
| 2,840,994 | Lobo | July 1, 1958 |
| 2,968,160 | Schilling | June 17, 1961 |